(12) United States Patent
Koo (10) Patent No.: US 12,110,053 B2
(45) Date of Patent: Oct. 8, 2024

(54) STEERING CONTROL SYSTEM, DEVICE, AND METHOD

(71) Applicant: HL MANDO CORPORATION, Gyeonggi-do (KR)

(72) Inventor: Jung Mo Koo, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 97 days.

(21) Appl. No.: 17/387,887

(22) Filed: Jul. 28, 2021

(65) Prior Publication Data

US 2022/0033000 A1   Feb. 3, 2022

(30) Foreign Application Priority Data

Jul. 29, 2020   (KR) .................. 10-2020-0094218

(51) Int. Cl.
| | |
|---|---|
| *B62D 15/02* | (2006.01) |
| *B62D 5/04* | (2006.01) |
| *B62D 6/00* | (2006.01) |

(52) U.S. Cl.
CPC .............. *B62D 15/02* (2013.01); *B62D 6/00* (2013.01); *B62D 5/046* (2013.01)

(58) Field of Classification Search
CPC .......... B62D 15/02; B62D 6/00; B62D 5/046; B62D 15/0245; B62D 5/0457; B62D 5/006; B62D 15/024
See application file for complete search history.

(56) References Cited

U.S. PATENT DOCUMENTS

| | | | | |
|---|---|---|---|---|
| 6,598,695 | B1 * | 7/2003 | Menjak | B62D 5/001 |
| | | | | 180/444 |
| 6,757,601 | B1 * | 6/2004 | Yao | B62D 6/002 |
| | | | | 701/41 |
| 10,065,675 | B2 * | 9/2018 | Codonesu | B62D 6/002 |
| 2002/0108804 | A1 * | 8/2002 | Park | B62D 5/005 |
| | | | | 180/444 |
| 2002/0129988 | A1 * | 9/2002 | Stout | B62D 6/008 |
| | | | | 180/422 |
| 2003/0023400 | A1 * | 1/2003 | Sanpei | G01D 5/24461 |
| | | | | 702/151 |

(Continued)

FOREIGN PATENT DOCUMENTS

| | | |
|---|---|---|
| DE | 10 2019 107 768 | 10/2019 |
| DE | 10 2020 130 704 | 6/2021 |

OTHER PUBLICATIONS

Office Action dated Nov. 10, 2023 for German Patent Application No. 102021208165.7 and its English machine translation from Google Translate.

*Primary Examiner* — Fadey S. Jabr
*Assistant Examiner* — Michael J Herrera
(74) *Attorney, Agent, or Firm* — Womble Bond Dickinson (US) LLP (57) ABSTRACT

The disclosure relates to a steering control system, a steering control device, and a steering control method. According to an embodiment of the disclosure, there is provided a steering control device, comprising a receiver receiving sensing data from at least one of a rack bar position sensor or a rack force sensor, a controller generating a first control signal to move a road wheel actuator and a second control signal to move the road wheel actuator and a transmitter transmitting the first control signal and the second control signal to the road wheel actuator.

13 Claims, 9 Drawing Sheets

(56) References Cited

U.S. PATENT DOCUMENTS

| | | | | |
|---|---|---|---|---|
| 2004/0167693 A1* | 8/2004 | Yao | ......................... | B62D 5/001 |
| | | | | 180/443 |
| 2005/0072621 A1* | 4/2005 | Hara | ...................... | B62D 1/163 |
| | | | | 180/444 |
| 2006/0070794 A1* | 4/2006 | Fujita | ................. | B62D 15/0245 |
| | | | | 180/446 |
| 2007/0282500 A1* | 12/2007 | Kouchi | .............. | B62D 15/0285 |
| | | | | 701/41 |
| 2009/0024279 A1* | 1/2009 | Takeda | ................... | B62D 6/008 |
| | | | | 701/41 |
| 2012/0303218 A1* | 11/2012 | Tamura | ................... | B62D 1/046 |
| | | | | 701/41 |
| 2013/0054074 A1* | 2/2013 | Schreiber | ............ | B62D 15/0245 |
| | | | | 701/23 |
| 2014/0081524 A1* | 3/2014 | Tamaizumi | ........... | B62D 5/0463 |
| | | | | 701/42 |
| 2015/0012158 A1* | 1/2015 | Makino | ................. | B60W 10/18 |
| | | | | 701/22 |
| 2015/0120121 A1* | 4/2015 | Nobumoto | ........... | B60W 10/184 |
| | | | | 701/1 |
| 2017/0113720 A1* | 4/2017 | Kodera | ................. | B62D 5/0472 |
| 2018/0079406 A1* | 3/2018 | Izumi | ..................... | B60W 10/20 |
| 2018/0079447 A1* | 3/2018 | Yamashita | ............ | B62D 5/0469 |
| 2018/0201307 A1* | 7/2018 | Kudo | ..................... | B62D 5/0463 |
| 2019/0009779 A1* | 1/2019 | Kim | ........................ | B62D 6/10 |
| 2019/0300052 A1* | 10/2019 | Allan | ................... | B62D 5/0457 |
| 2019/0351941 A1* | 11/2019 | Uematsu | .................. | B62D 6/02 |
| 2020/0023893 A1* | 1/2020 | Naik | ..................... | B62D 5/0466 |
| 2021/0309292 A1* | 10/2021 | Suzuki | ................... | B62D 6/008 |

\* cited by examiner

STEERING CONTROL SYSTEM, DEVICE, AND METHOD

CROSS-REFERENCE TO RELATED APPLICATION

This application claims priority from Korean Patent Application No. 10-2020-0094218, filed on Jul. 29, 2020, which is hereby incorporated by reference for all purposes as if fully set forth herein.

BACKGROUND

Field

The disclosure relates to a steering control system, device, and method and, more specifically, to a steering control system, device, and method in which a road wheel actuator (RWA) is moved based on position values changed as a steering wheel feedback actuator (SFA) is rotated, and a sensor detects the position of the road wheel actuator, thereby setting a mid-point between the steering wheel feedback actuator and the road wheel actuator.

Description of Related Art

In general, a vehicle adopts a power steering assist device as means to ensure steering stability by reducing the steering force of the steering wheel. Conventionally, hydraulic power steering (HPS) has been widely used as power steering assist devices but are recently being replaced with electric power steering (EPS) which facilitates steering using a motor, instead of a hydraulic pump, and is eco-friendly.

Meanwhile, to reduce weight in vehicles, steer-by-wire (SBW) systems have been developed which electrically connect the steering shaft (or column), including the steering wheel and the reaction force motor, with the actuator, including the wheels and rack bar, and transmit the driver's steering force.

Unlike general steering devices, the SBW system consists of a steer wheel feedback actuator (SFA) and a road wheel actuator (RWA). However, due to a lack of mechanical connection between the two components, the angle of the SFA and the position of the RWA may occasionally fall out of synchronization, causing the driver to feel like steering does not work as intended.

BRIEF SUMMARY

According to embodiments of the disclosure, there is provided a steering control system, device, and method that may set a mid-point between a steering wheel feedback actuator and a road wheel actuator by calculating a position value corresponding to a full stroke from a maximum displacement position value of the road wheel actuator.

According to an embodiment of the disclosure, there is provided a steering control device, comprising a receiver receiving sensing data from at least one of a steering wheel feedback actuator (SFA) rotation angle sensor, a rack bar position sensor, a rack force sensor, or a steering wheel steering angle sensor, a controller generating a first control signal to move a road wheel actuator by a position value corresponding to a predetermined rotation angle, counterclockwise from a neutral position of a steering wheel feedback actuator and a second control signal to move the road wheel actuator by a position value corresponding to a predetermined rotation angle, clockwise from the neutral position of the steering wheel feedback actuator, and set a mid-point between the steering wheel feedback actuator and the road wheel actuator based on maximum displacement position values of the road wheel actuator moved by the first control signal and the second control signal, and a transmitter transmitting the first control signal and the second control signal to the road wheel actuator.

According to an embodiment of the disclosure, there is provided a steering control method, comprising transmitting, to a road wheel actuator, a first control signal to move by a position value corresponding to a predetermined rotation angle, counterclockwise from a neutral position of a steering wheel feedback actuator, receiving a maximum displacement position value of the road wheel actuator moved by the first control signal, transmitting, to the road wheel actuator, a second control signal to move by a position value corresponding to the predetermined rotation angle, clockwise from the neutral position of the steering wheel feedback actuator, receiving a maximum displacement position value of the road wheel actuator moved by the second control signal, and setting a mid-point between the steering wheel feedback actuator and the road wheel actuator based on the maximum displacement position values of the road wheel actuator moved by the first control signal and the second control signal.

According to embodiments of the disclosure, the steering control device may easily find a mid-point between the road wheel actuator and the steering wheel feedback actuator and enables quick setting of a mid-point in the production line.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, a steering control system 1 according to an embodiment is described with reference to FIG. 1.

Figure 1:
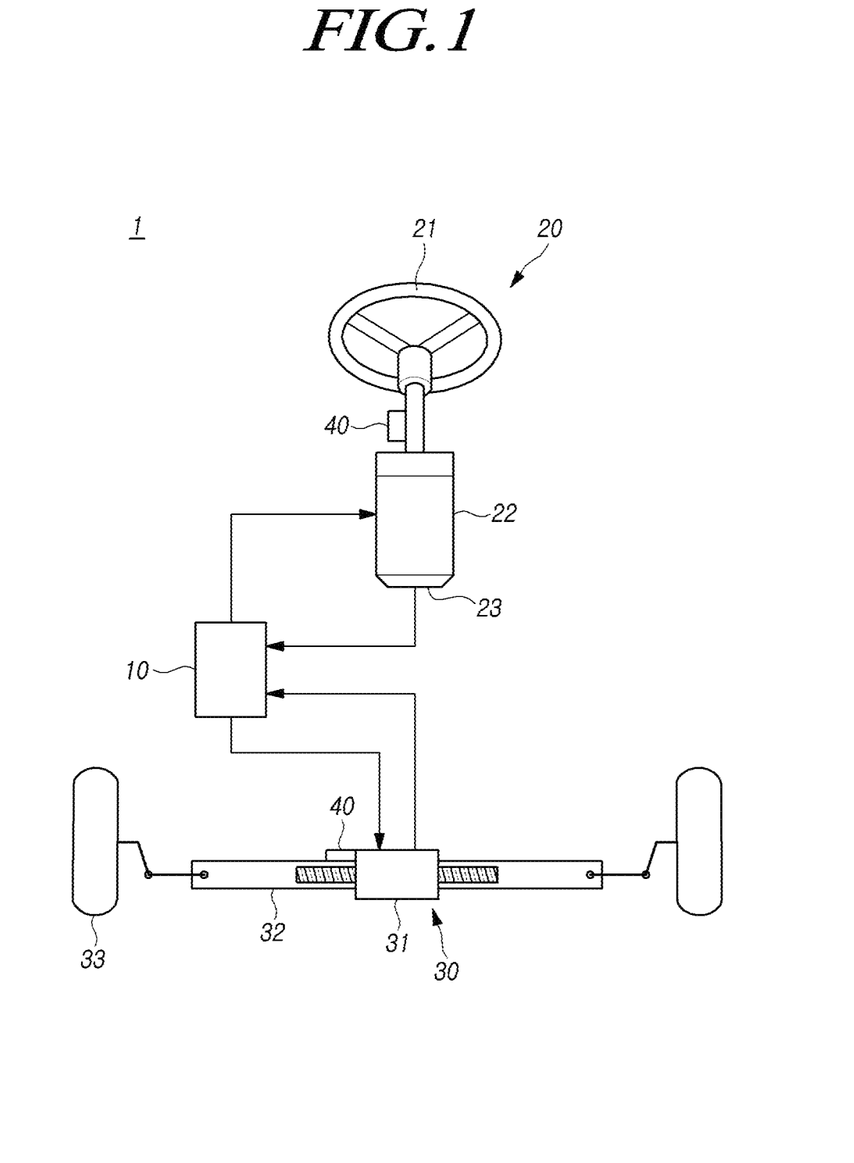
FIG. 1 is a block diagram illustrating a steering control system according to an embodiment of the disclosure.

FIG. 1 is a block diagram illustrating a steering control system 1 according to an embodiment of the disclosure.

Referring to FIG. 1, according to an embodiment of the disclosure, a steering control system 1 may include a steering control device 10, a steering wheel feedback actuator (SFA) 20, a road wheel actuator (RWA) 30, and a sensor 40. In the steering control system 1, the steering wheel feedback actuator 20 and the road wheel actuator 30 may be mechanically separated from each other.

The steering control system 1 may be configured so that a steering angle sensor and a torque sensor are coupled to a side of a steering shaft connected with a steering wheel 21 and, when the driver manipulates the steering wheel 21, the steering wheel assembly and the torque sensor detect the manipulation and send electrical signals to the steering control device 10 to thereby operate a reaction force motor and a pinion shaft motor.

For convenience of description, the steering wheel feedback actuator 20 is simply referred to as an SFA 20.

The SFA 20 may refer to a device to which steering information intended by the driver is input. As described above, the SFA 20 may include a steering wheel 21, a steering shaft 22, and a reaction force motor 23.

The reaction force motor 23 may receive a control signal (or referred to as a 'command current') from the steering control device 10 and apply a reaction force to the steering wheel 21. Specifically, the reaction force motor 23 may receive a command current from the steering control device 10 and drive at a rotation speed indicated by the command current, generating reaction torque.

The steering control device 10 may receive steering information from the SFA 20, calculate a control value, and output an electrical signal indicating the control value to the road wheel actuator 30. Here, the steering information may refer to information including at least one of a steering angle or a driver torque.

For convenience of description, the road wheel actuator 30 is simply referred to as an RFA 30.

The RWA 30 may refer to a device that actually drives the host vehicle to steer. The RWA 30 may include a steering motor 31, a rack bar 32, and wheels 33.

The steering motor 31 may axially move the rack bar 32. Specifically, the steering motor 31 may receive a command current from the steering control device 10 and thus drive, and may allow the rack bar 32 to linearly move in the axial direction. Here, the command current may include the position of the rack calculated by the steering control device 10.

As driven by the steering motor 121, the rack bar 32 may perform a linear motion which allows the wheels 123 to turn to the left or right.

The sensor 40 may include, but are not limited to, a rack bar position sensor, a rack force sensor, and a steering wheel steering angle sensor.

In the steering control system 10, the sensor 40 may detect the steering angle of the steering wheel and transmits the detected steering angle to the steering control device 10, and the sensor 40 may also detect the position and rack force of the rack bar and transmits the detected position and rack force to the steering control device 10.

The steering control device 10 may set the mid-point between the SFA 20 and the RWA 30 based on the position value of the RWA 30 that moves according to the rotation angle of the SFA 20.

Figure 2:
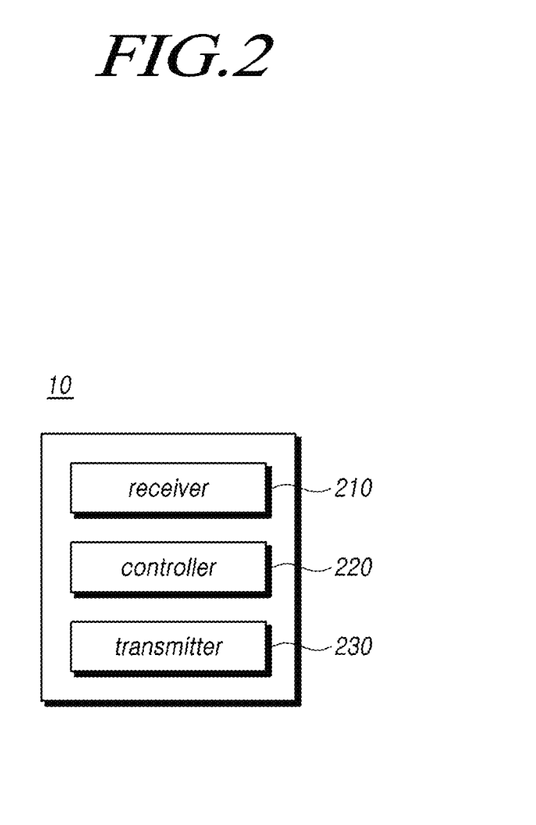
FIG. 2 is a block diagram illustrating a steering control device according to an embodiment of the disclosure.

FIG. 2 is a block diagram illustrating a steering control device 10 according to an embodiment of the disclosure.

Referring to FIG. 2, a steering control device 10 may include a receiver 210, a controller 220, and a transmitter 230.

The receiver 210 may receive sensing data from at least one of a rack bar position sensor, a rack force sensor, or a steering wheel steering angle sensor. The rack force may be an external force received by the rack gear.

The controller 220 may generate a first control signal to move the RWA 30 by a position value corresponding to a predetermined rotation angle, counterclockwise from a neutral position of the SFA 20 and a second control signal to move the RWA 30 by a position value corresponding to a predetermined rotation angle, clockwise from the neutral position of the SFA 20, and set the mid-point between the SFA 20 and the RWA 30 based on the maximum displacement position values of the RWA 30 moved by the first control signal and the second control signal. The rotation angle of the SFA 20 means the rotation angle, i.e., steering angle, of the steering wheel included in the SFA 20, and movement of the RWA 30 may mean movement of the rack bar included in the RWA 30.

In generating the first control signal, the controller 220 may set the position value, which corresponds to the predetermined rotation angle counterclockwise from the neutral position of the SFA 20, to be larger than a limit of the movement of the RWA 30. To set the mid-point between the SFA 20 and the RWA 30, the controller 220 needs to set full stroke position values for the clockwise and counterclockwise directions and, to that end, sets the position value according to the first control signal to be larger than the limit of the movement of the RWA 30. 'Full stroke' refers to a limit to which the RWA 30 is moved under the control of the steering wheel 21. Full stroke may be divided into clockwise full stroke and counterclockwise full stroke. The position value corresponding to the predetermined rotation angle may be loaded from a data sheet of preset SFA 20 rotation angle values and position values.

Thus, the controller 220 may set a counterclockwise full stroke value of the SFA 20 based on a difference between the position value of the first control signal and the maximum displacement position value of the RWA 30 moved by the first control signal, set a clockwise full stroke value of the SFA 20 based on a difference between the position value of the second control signal and the maximum displacement position value of the RWA 30 moved by the second control signal, and set the mid-value between the clockwise full stroke value and the counterclockwise full stroke value as the mid-point between the SFA 20 and the RWA 30.

Figure 3:
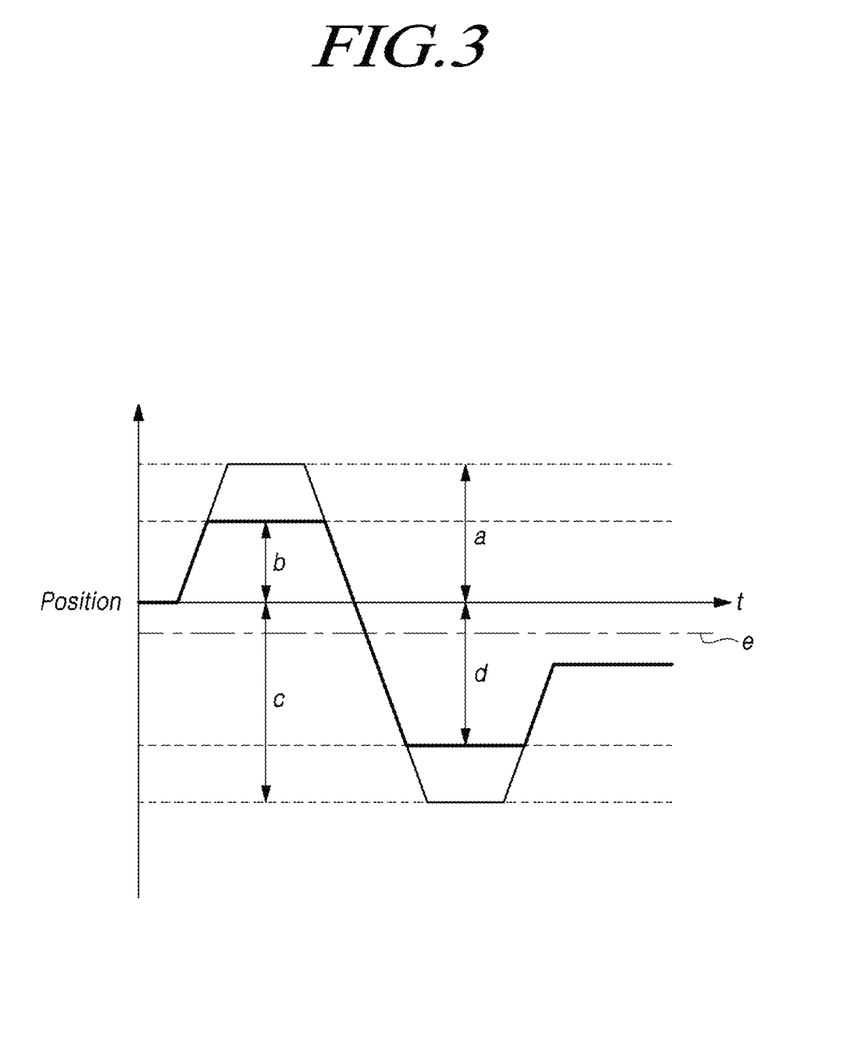
FIG. 3 is a view illustrating a mid-point between a steering wheel feedback actuator and a road wheel actuator based on a clockwise full stroke value and a counterclockwise full stroke value according to an embodiment of the disclosure.

FIG. 3 is a view illustrating a mid-point between an SFA 20 and an RWA 30 based on a clockwise full stroke value and a counterclockwise full stroke value according to an embodiment of the disclosure.

Referring to FIG. 3, a denotes the position value set in the first control signal described above, and b denotes the position value of the RWA 30 moved to the maximum according to the set position value. In other words, in FIG. 3, b denotes the maximum displacement position value of the RWA 30 based on the first control signal and may be the counterclockwise full stroke position value. In FIG. 3, c denotes the position value set in the second control signal described above, and d denotes the position value of the RWA 30 moved to the maximum according to the set position value. In other words, in FIG. 3, d denotes the maximum displacement position value of the RWA 30 based on the second control signal and may be the clockwise full stroke position value.

Accordingly, the controller 220 may set e, which is the mid-value between the counterclockwise full stroke position value and the clockwise full stroke position value, as the mid-point between the SFA 20 and the RWA 30.

To this end, the controller 220 may set a value larger than a rotation angle value corresponding to the counterclockwise full stroke value of the SFA 20 as a predetermined rotation angle value.

As described above, the steering controller 10 may set the mid-point between the SFA 20 and the RWA 30 by setting the counterclockwise and clockwise full strokes through the maximum displacement position value of the RWA 30.

Figure 4:
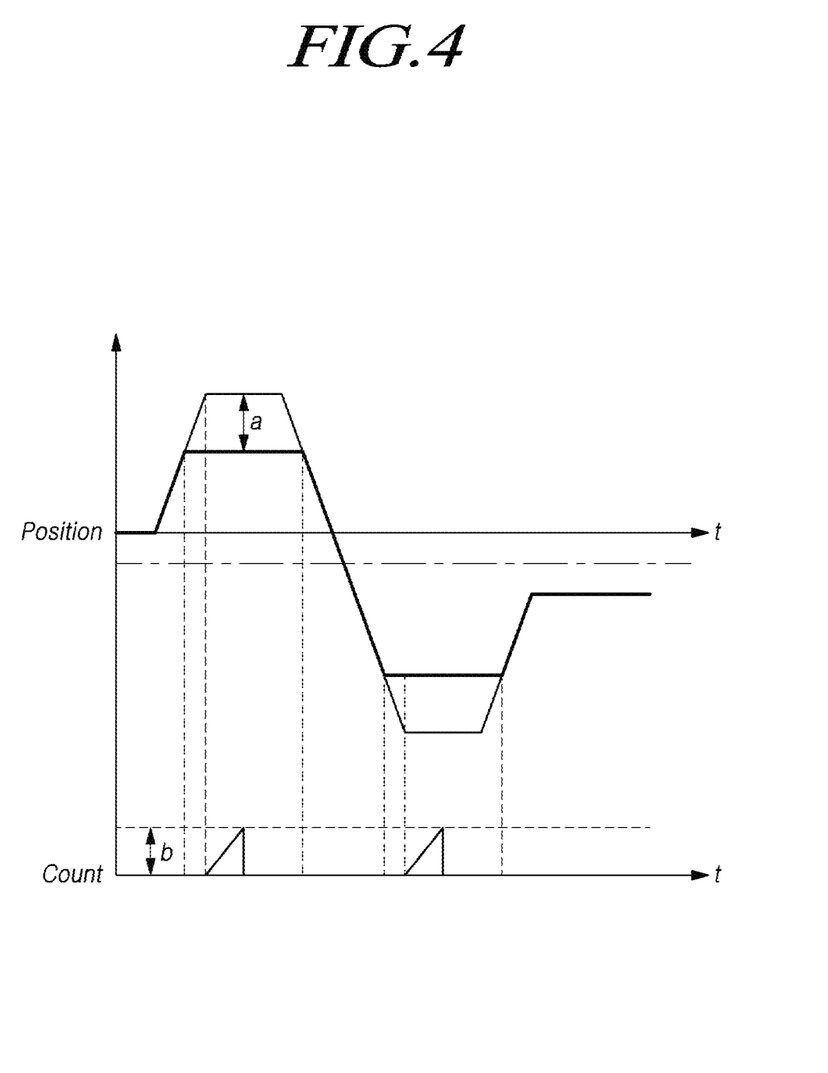
FIG. 4 is a view illustrating an example of counting to derive a full stroke position value from a maximum displacement position value of a road wheel actuator according to an embodiment of the disclosure.

FIG. 4 is a view illustrating an example of counting to derive a full stroke position value from a maximum displacement position value of a RWA 30 according to an embodiment of the disclosure.

Referring to FIG. 4, if a difference between the maximum displacement position value of the RWA 30 moved by the first control signal and the position value of the first control signal is a threshold or more, the controller 220 may set the maximum displacement position value of the RWA 30 as the counterclockwise full stroke of the SFA 20. Specifically, since the RWA 30 is moved by the first control signal, and the position value set in the first control signal is larger than the position value by which the RWA 30 may be moved, a difference may occur between the counterclockwise maximum displacement position value of the RWA 30 by the first control signal and the position value set in the first control signal. If the difference in position value is the threshold or more as denoted with a in FIG. 4, the controller 220 may set it as the counterclockwise full stroke.

Further, if the difference between the position value of the first control signal and the maximum displacement position value of the RWA 30 moved by the first control signal becomes the threshold or more every predetermined cycle, the controller 220 counts it and, if the counted value is a predetermined value or more, set it as the counterclockwise full stroke. If the difference in the maximum displacement position value of the RWA 30 is the threshold as denoted with a in FIG. 4, the controller 220 counts it every predetermined cycle and, if the counted value is the predetermined value as denoted with b in FIG. 4, the controller 220 may set the maximum displacement position value of the RWA 30 as the counterclockwise full stroke.

As described above, the steering control device 10 may more precisely set the mid-point between the SFA 20 and the RWA 30 by counting according to the maximum displacement position value of the RWA 30 for a predetermined cycle.

Figure 5:
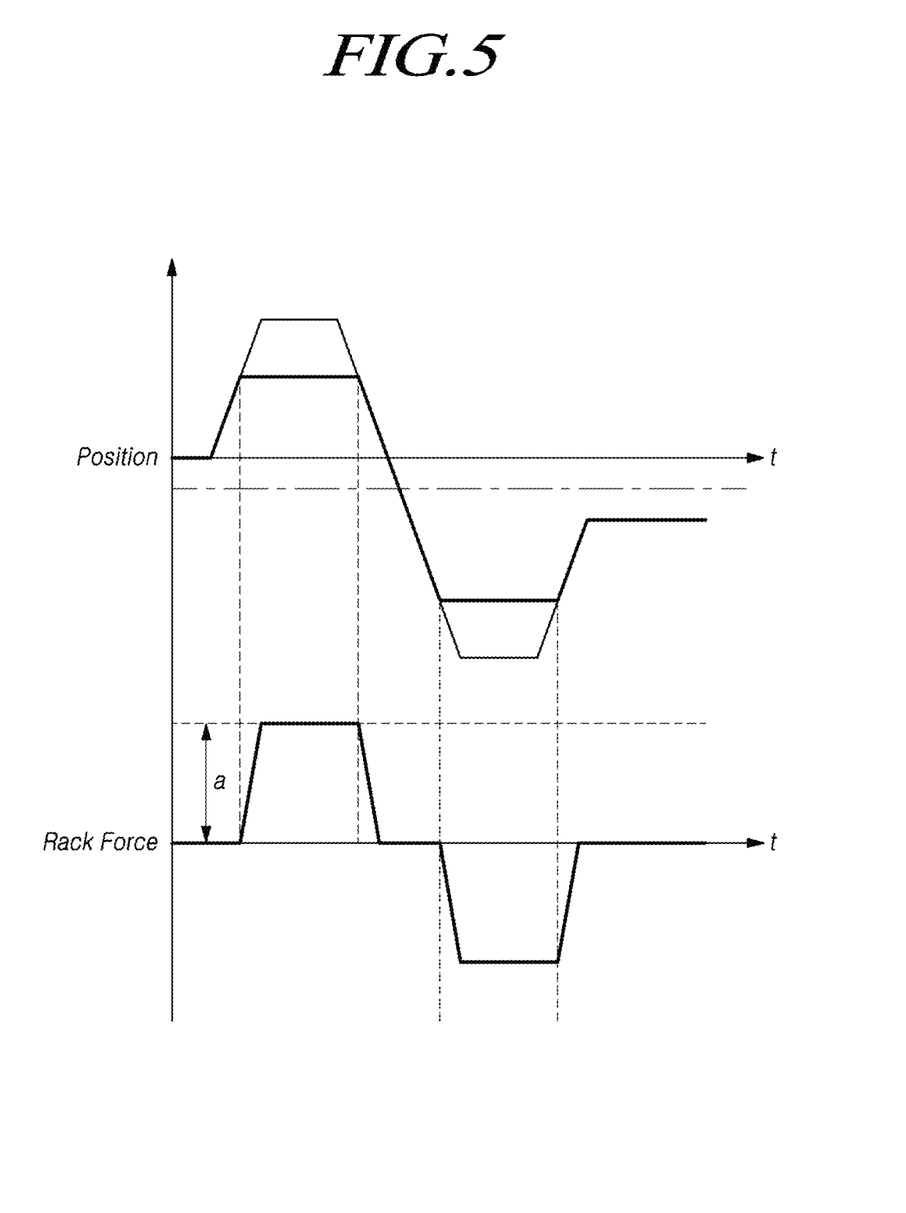
FIG. 5 is a view illustrating a mid-point between a steering wheel feedback actuator and a road wheel actuator based on a maximum displacement position value and a rack force value of the road wheel actuator.

FIG. 5 is a view illustrating an example of setting a mid-point between an SFA 20 and an RWA 30 based on a maximum displacement position value and a rack force value of the RWA 30.

Referring to FIG. 5, the controller 220 may set a mid-point between the SFA 20 and the RWA 30 based on the rack force value detected at the maximum displacement position value of the RWA moved by the first control signal and the second control signal. As the RWA 30 is moved to the maximum, the load applied to the rack gear increases as well. Thus, the rack force value may serve as a reference for setting the full stroke. Thus, if the rack force value is a preset rack force value, as denoted with a in FIG. 5, or more, the controller 220 may set the maximum displacement position value of the RWA 30 as the full stroke.

If the rack force value is increased by the first control signal, the controller 220 may set the maximum displacement position value of the RWA 30 as the counterclockwise full stroke and, if the rack force value is decreased by the second control signal, set the maximum displacement position value of the RWA as the clockwise full stroke and may set the mid-value between the clockwise full stroke value and the counterclockwise full stroke value as the mid-point between the SFA 20 and the RWA 30. As the RWA 30 is moved to the position value set in the first control signal, an external force is applied to the rack gear, and the rack force value may increase. Thus, it may be shown that an increase in rack force value is influenced by substantial movement of the RWA 30 and thus rotation of the SFA 20.

As described above, the steering control device 10 may set the mid-point between the RWA 30 and the SFA 20 through the rack force value and the maximum displacement position value of the RWA 30.

Figure 6:
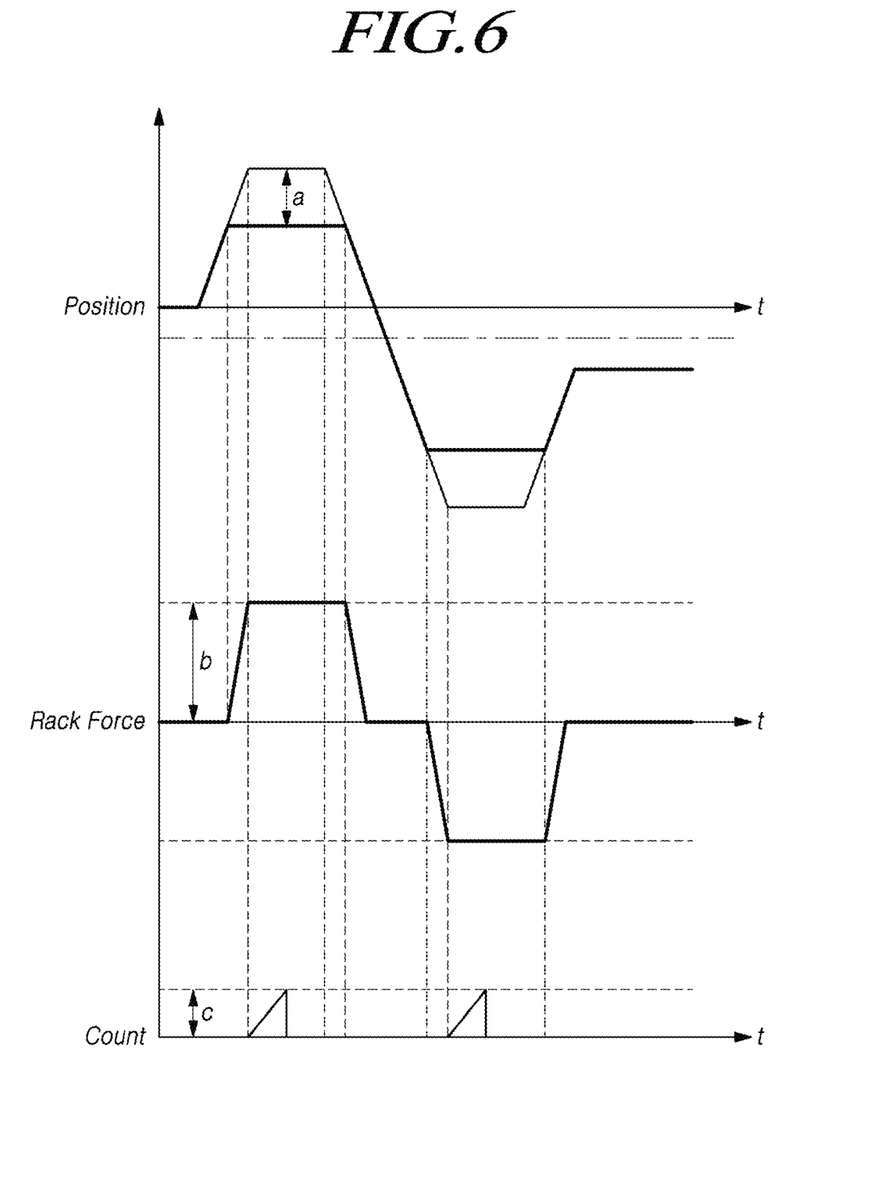
FIG. 6 is a view illustrating setting a mid-point between a steering wheel feedback actuator and a road wheel actuator based on a maximum displacement position value, rack force value, and counted value of the road wheel actuator.

FIG. 6 is a view illustrating setting a mid-point between an SFA 20 and an RWA 30 based on a maximum displacement position value, rack force value, and counted value of the road wheel actuator.

Referring to FIG. 6, if the difference between the position value of the first control signal and the maximum displacement position value of the RWA 30 moved by the first control signal is a threshold or more, and the rack force value of the RWA 30 is a predetermined rack force value or more, every predetermined cycle, the controller 220 may count it and, if the counted value is a predetermined value or more, set the maximum displacement position value of the RWA 30 as the counterclockwise full stroke. If the difference between the maximum displacement position value of the RWA 30 and the position value of the first control signal is the threshold or more (a of FIG. 6), the rack force value is the predetermined rack force value or more (b of FIG. 6), and the counted value is the predetermined value or more (c of FIG. 6), the controller 220 may set the maximum displacement position value of the RWA 30 as the counterclockwise full stroke.

As described above, the steering control device 10 may set a more precise mid-point between the SFA 20 and the RWA 30 based on the difference between the maximum displacement position value of the RWA 30 and the position value of the control signal, the rack force value, and the counted value.

For the second control signal, the same set position value and steering angle of the SFA 20 as those of the first control signal may be applied, except that they are based on the clockwise direction. For example, in FIG. 6, if the difference between the position value of the second control signal and the maximum displacement position value of the RWA 30 moved by the second control signal is the threshold or more, and the rack force value of the RWA 30 is the predetermined rack force value or more, every predetermined cycle, the controller 220 may count it and, if the counted value is the predetermined value, set the maximum displacement position value of the RWA 30 as the clockwise full stroke. As another example, the position values a and c of FIG. 3 may be identical to each other. Accordingly, no description of the second control signal is given below.

The controller 220 may transmit a third control signal to move by a specific position value to the mid-point-set RWA 30. If the position value of the RWA 30 moved according to the third control signal and the position value of the third control signal is a preset position value or less, the controller 220 may count the third control signal. The controller 220 may transmit the third control signal to the RWA 30 while varying the preset position value and, if the counted value is a preset value or more, the controller 220 may determine that the self centering of the RWA 30 and the SFA 20 has been completed. The above-described predetermined position value may be set to be smaller than the maximum displacement position value of the RWA 30.

The transmitter 230 may transmit the first control signal and the second control signal to the RWA 30. The transmitter 230 may receive control information for the vehicle, related to electronic power steering (EPS).

According to the disclosure, the steering control device 10 may be implemented as an electronic control unit (ECU).

The ECU may include at least one or more of one or more processors, a memory, a storage unit, a user interface input unit, or a user interface output unit which may communicate with one another via a bus. The ECU may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Described below is a steering control method using the steering control device 10 capable of performing the above-described embodiments of the disclosure.

Figure 7:
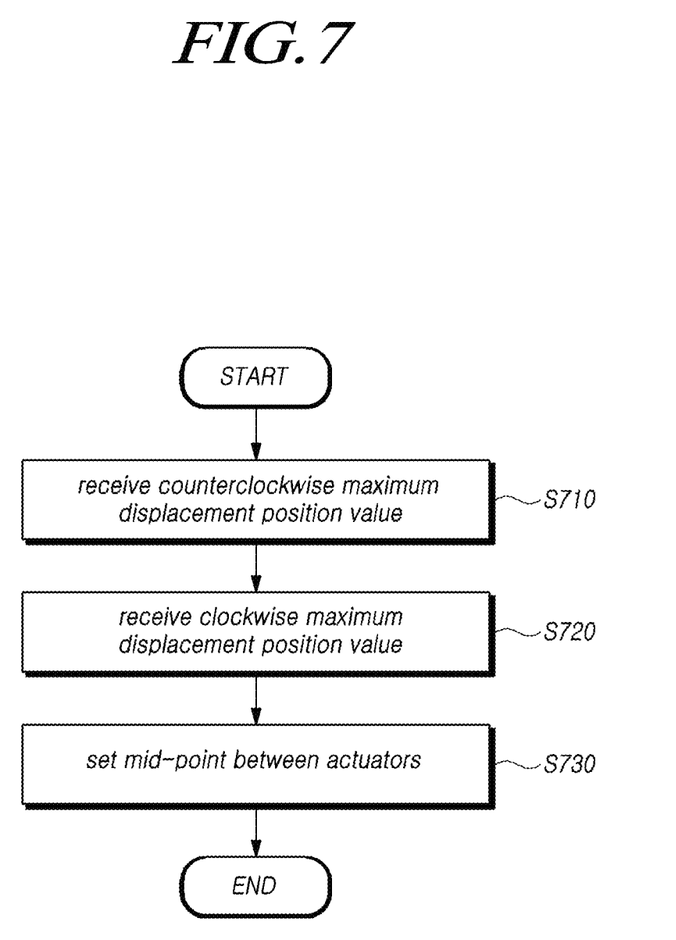
FIG. 7 is a flowchart illustrating a steering control method according to an embodiment of the disclosure.

FIG. 7 is a flowchart illustrating a steering control method according to an embodiment of the disclosure.

Referring to FIG. 7, according to an embodiment of the disclosure, a steering control method may comprise transmitting, to a road wheel actuator, a first control signal to move by a position value corresponding to a predetermined rotation angle, counterclockwise from a neutral position of a steering wheel feedback actuator and receiving a maximum displacement position value of the road wheel actuator moved by the first control signal (S710); transmitting, to the road wheel actuator, a second control signal to move by a position value corresponding to the predetermined rotation angle, clockwise from the neutral position of the steering wheel feedback actuator and receiving a maximum displacement position value of the road wheel actuator moved by the second control signal (S720); and setting a mid-point between the steering wheel feedback actuator and the road wheel actuator based on the maximum displacement position values of the road wheel actuator moved by the first control signal and the second control signal (S730).

Thus, setting the mid-point (S730) may include setting a counterclockwise full stroke value of the SFA 20 based on a difference between the position value of the first control signal and the maximum displacement position value of the RWA 30 moved by the first control signal, setting a clockwise full stroke value of the SFA 20 based on a difference between the position value of the second control signal and the maximum displacement position value of the RWA 30 moved by the second control signal, and setting the mid-value between the clockwise full stroke value and the counterclockwise full stroke value as the mid-point between the SFA 20 and the RWA 30.

Receiving the counterclockwise maximum displacement position value (S710) may include setting a value larger than a rotation angle corresponding to the counterclockwise full stroke value of the SFA 20 as a predetermined rotation angle.

Setting the mid-point (S730) may include, if the difference between the maximum displacement position value of the RWA 30 moved by the first control signal and the position value of the first control signal is a threshold or more, setting the maximum displacement position value of the RWA 30 as the counterclockwise full stroke value of the SFA 20.

Setting the mid-point (S730) may include counting, every predetermined cycle, when the difference between the position value of the first control signal and the maximum displacement position value of the RWA 30 moved by the first control signal and, if the counted value is a predetermined value or more, setting the maximum displacement position value of the RWA 30 as the counterclockwise full stroke value.

Setting the mid-point (S730) may include setting the mid-point between the SFA 20 and the RWA 30 based on a rack force value detected at the maximum displacement position value of the RWA 30 moved by the first control signal and the second control signal.

Setting the mid-point (S730) may include setting the maximum displacement position value of the RWA 30 as a counterclockwise full stroke value if the rack force value is increased by the first control signal and setting the maximum displacement position value of the RWA 30 as a clockwise full stroke value if the rack force value is decreased by the second control signal to thereby set a mid-value between the clockwise full stroke value and the counterclockwise full stroke value as the mid-point between the SFA 20 and the RWA 30.

Setting the mid-point (S730) may include counting, every predetermined cycle, when the difference between the position value of the first control signal and the maximum displacement position value of the RWA 30 moved by the first control signal is a threshold or more, and the rack force value of the RWA 30 is a predetermined rack force value or more and, if the counted value is a predetermined value or more, setting the maximum displacement position value of the RWA 30 as the counterclockwise full stroke value.

Figure 8:
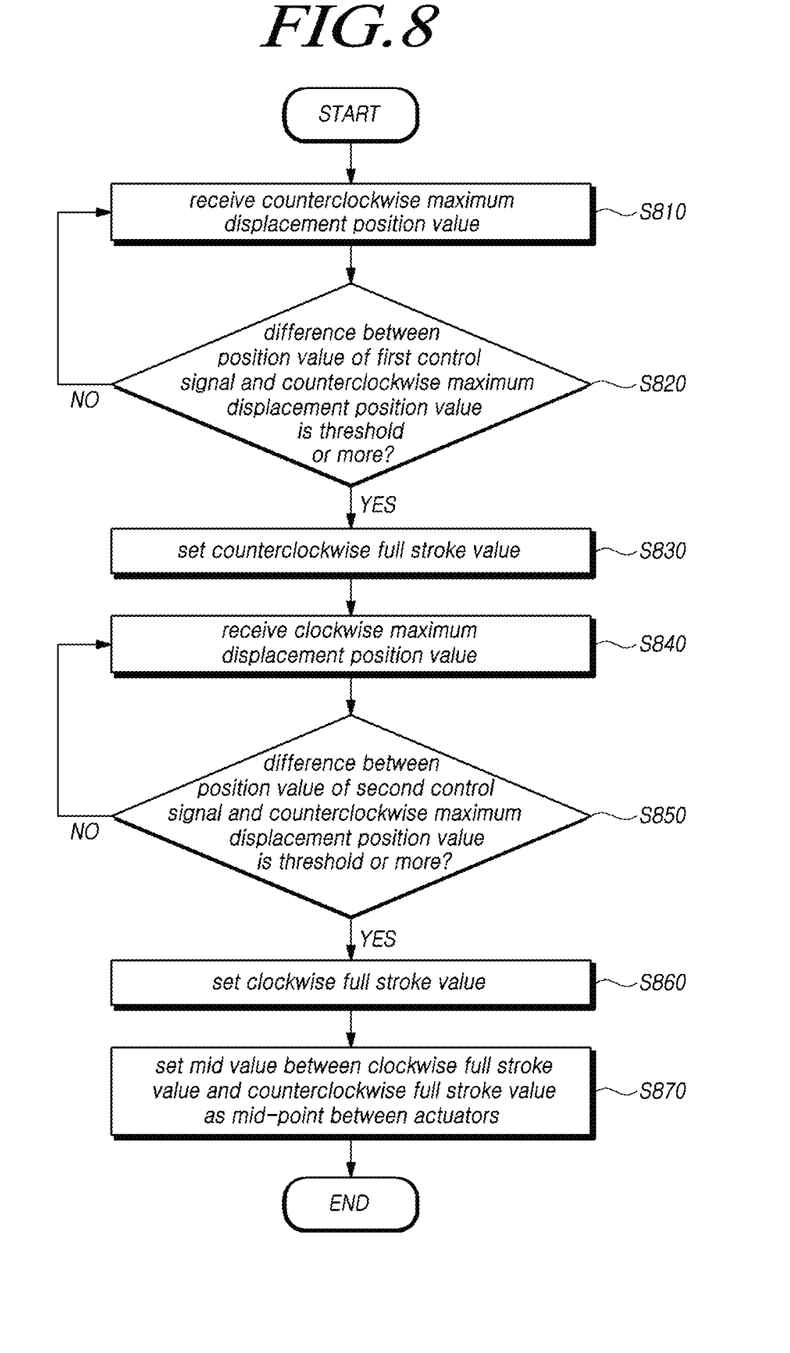
FIG. 8 is a flowchart illustrating a method for setting a mid-point between a steering wheel feedback actuator and a road wheel actuator based on a maximum displacement position value of the road wheel actuator and position values of a first control signal and a second control signal according to an embodiment of the disclosure.

FIG. 8 is a flowchart illustrating a method for setting a mid-point between an SFA 20 and an RWA 30 based on a maximum displacement position value of the RWA 30 and position values of a first control signal and a second control signal according to an embodiment of the disclosure.

Referring to FIG. 8, the steering control device 10 may receive a counterclockwise maximum displacement position value (S810). The steering control device 10 may transmit a first control signal to the RWA 30 and receive, from the sensor 40, a counterclockwise maximum displacement position value of the RWA 30 moved according to the first control signal.

The steering control device 10 may determine whether the difference between the position value of the first control signal and the counterclockwise maximum displacement position value is a threshold or more (S820).

If the difference between the position value of the first control signal and the counterclockwise maximum displacement position value is the threshold or more (Yes in S820), the steering control device 10 may determine that it is a counterclockwise full stroke (S830). If the difference between the position value of the first control signal and the counterclockwise maximum displacement position value is less than the threshold, the steering control device 10 may receive the counterclockwise maximum displacement position value (No in S820). This is why the maximum displacement position value of the RWA 30 increases (the second signal decreases) over time and, after a predetermined time, becomes constant.

The steering control device 10 may receive a clockwise maximum displacement position value (S840).

The steering control device 10 may determine whether the difference between the position value of the second control signal and the counterclockwise maximum displacement position value is a threshold or more (S850).

If the difference between the position value of the second control signal and the counterclockwise maximum displacement position value is the threshold or more (Yes in S850), the steering control device 10 may set the clockwise maximum displacement position value as the clockwise full stroke value (S860). If the difference between the position value of the second control signal and the counterclockwise maximum displacement position value is less than the threshold (No in S850), the steering control device 10 may receive the clockwise maximum displacement position value.

The steering control device 10 may set the mid-value between the clockwise full stroke value and the counterclockwise full stroke value as the mid-point of the actuator (S870).

Figure 9:
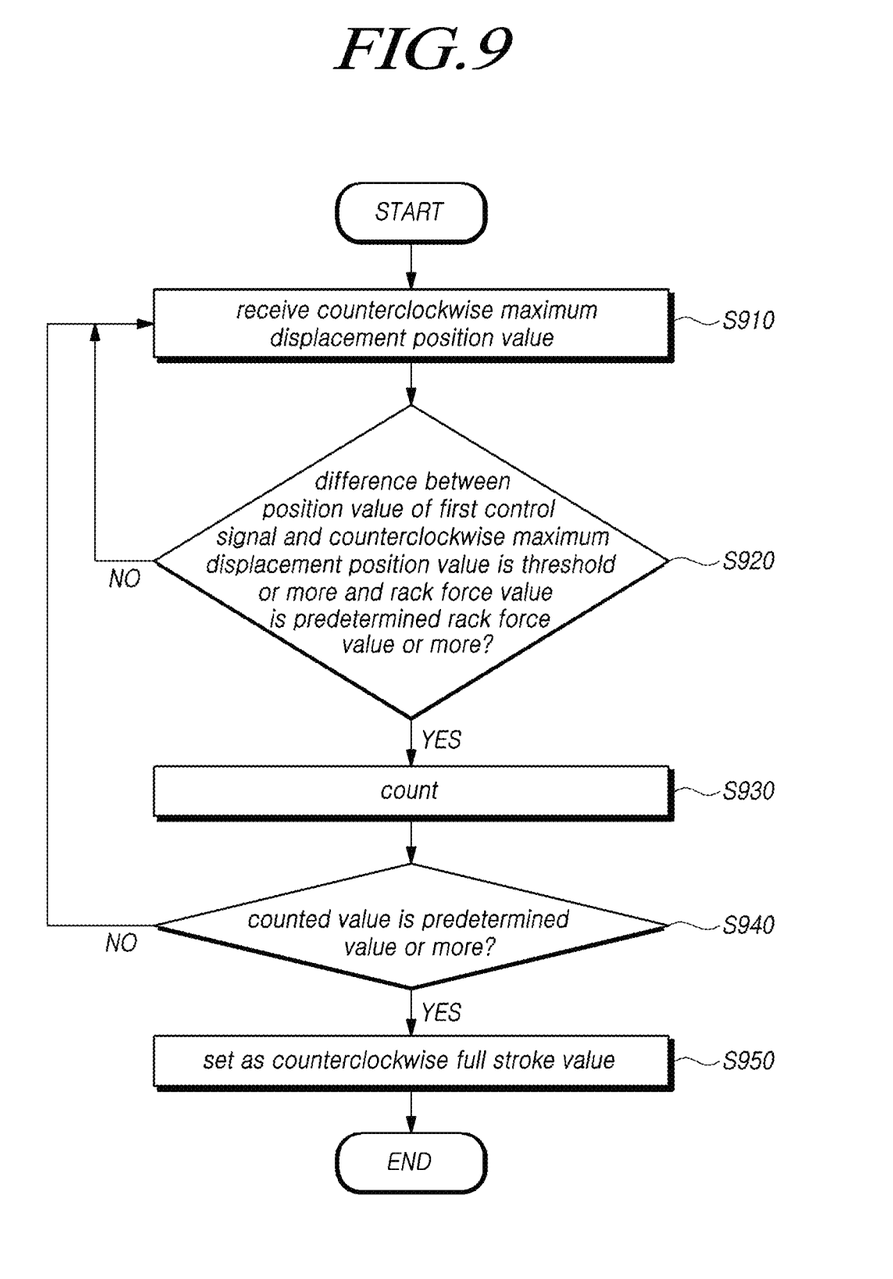
FIG. 9 is a flowchart more specifically illustrating step S830 according to an embodiment.

FIG. 9 is a flowchart more specifically illustrating step S830 according to an embodiment.

The steering control device 10 may receive a counterclockwise maximum displacement position value (S910).

The steering control device 10 may determine whether the difference between the position value of the first control signal and the counterclockwise maximum displacement position value is a threshold or more and whether the rack force value is a predetermined rack force value or more during a predetermined cycle (S920).

If the difference between the position value of the first control signal and the counterclockwise maximum displacement position value is the threshold or more, and the rack force value is the predetermined rack force value or more during the predetermined cycle (Yes in S920), the steering control device 10 may count it (S930). If the difference between the position value of the first control signal and the counterclockwise maximum displacement position value is threshold or more, and the rack force value is the predetermined rack force value or more during the predetermined cycle (No in S920), the steering control device 10 may receive the counterclockwise maximum displacement position value.

The steering control device 10 may determine whether the counted value is a predetermined value (S940). The steering control device 10 may determine whether step S920 is maintained through the counted value.

If the counted value is the predetermined value or more (Yes in S920), the steering control device 10 may set the counterclockwise maximum displacement position value as the counterclockwise full stroke value (S950). If the counted value is less than the predetermined value (Yes in S920), the steering control device 10 may receive the counterclockwise maximum displacement position value.

Although an example of setting the counterclockwise full stroke value according to the first control signal has been described above, the position value and rack force value for the second control signal may be identical to those for the first control signal except that the opposite direction is applied.

The steering control device 10 may transmit a third control signal to move by a specific position value to the mid-point-set RWA 30. If the position value of the RWA 30 moved according to the third control signal and the position value of the control signal are a preset position value or less, the steering control device 10 may count it. The steering control device 10 may transmit the third control signal to the RWA 30 while varying the preset position value and, if the counted value is a preset value or more, the steering control device 10 may determine that the self centering of the RWA 30 and the SFA 20 has been completed. The above-described predetermined position value may be set to be smaller than the maximum displacement position value of the RWA 30.

As described above, according to the disclosure, the steering control device 10 may easily find the mid-point between the RWA 30 and the SFA 20 and enables quick setting of a mid-point in the production line.

The technology of providing the steering control system, steering control device 10, and steering control method may be implemented as an application or in the form of program instructions executable through various computer components, which may then be recorded in a computer-readable recording medium. The computer-readable medium may include programming commands, data files, or data structures, alone or in combinations thereof.

The programming commands recorded in the computer-readable medium may be specially designed and configured for the disclosure or may be known and available to one of ordinary skill in the computer software industry.

Examples of the computer readable recording medium may include, but is not limited to, magnetic media, such as hard disks, floppy disks or magnetic tapes, optical media, such as CD-ROMs or DVDs, magneto-optical media, such as floptical disks, memories, such as ROMs, RAMS, or flash memories, or other hardware devices specially configured to retain and execute programming commands.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering control device, comprising:
   a receiver receiving sensing data from at least one of a rack bar position sensor or a rack force sensor;
   a controller generating a first control signal to move a road wheel actuator, operably coupled to road wheels to steer the road wheels, by a position value corresponding to a predetermined rotation angle, counterclockwise from a neutral position of a steering wheel feedback actuator, operably coupled to a steering wheel to provide a reaction force to the steering wheel and not mechanically coupled with the road wheel actuator, and a second control signal to move the road wheel actuator by a position value corresponding to a predetermined rotation angle, clockwise from the neutral position of the steering wheel feedback actuator, and set a mid-point of the steering wheel feedback actuator and a mid-point of the road wheel actuator based on maximum displacement position values of the road wheel actuator moved by the first control signal and the second control signal; and
   a transmitter transmitting the first control signal and the second control signal to the road wheel actuator,
   wherein the controller sets a counterclockwise full stroke value of the steering wheel feedback actuator based on a difference between the position value of the first control signal and the maximum displacement position value of the road wheel actuator moved by the first control signal, sets a clockwise full stroke value of the steering wheel feedback actuator based on a difference between the position value of the second control signal and the maximum displacement position value of the road wheel actuator moved by the second control signal, and sets a mid-value between the clockwise full stroke value and the counterclockwise full stroke value as the mid-point between the steering wheel feedback actuator and the road wheel actuator, and
   wherein if the difference between the maximum displacement position value of the road wheel actuator moved by the first control signal and the position value of the first control signal is a threshold or more, the controller sets the maximum displacement position value of the road wheel actuator as the counterclockwise full stroke value of the steering wheel feedback actuator.

2. The steering control device of claim 1, wherein the controller sets a value larger than a rotation angle corresponding to the counterclockwise full stroke value of the steering wheel feedback actuator as a predetermined rotation angle.

3. The steering control device of claim 1, wherein the controller counts, every predetermined cycle, when the difference between the position value of the first control signal and the maximum displacement position value of the road wheel actuator moved by the first control signal and, if the counted value is a predetermined value or more, sets the maximum displacement position value of the road wheel actuator as the counterclockwise full stroke value.

4. The steering control device of claim 1, wherein the controller sets the mid-point between the steering wheel feedback actuator and the road wheel actuator based on a rack force value detected at the maximum displacement position value of the road wheel actuator moved by the first control signal and the second control signal.

5. The steering control device of claim 4, wherein the controller sets the maximum displacement position value of the road wheel actuator as a counterclockwise full stroke value if the rack force value is increased by the first control signal and sets the maximum displacement position value of the road wheel actuator as a clockwise full stroke value if the rack force value is decreased by the second control signal to thereby set a mid-value between the clockwise full stroke value and the counterclockwise full stroke value as the mid-point between the steering wheel feedback actuator and the road wheel actuator.

6. The steering control device of claim 5, wherein the controller counts, every predetermined cycle, when the difference between the position value of the first control signal and the maximum displacement position value of the road wheel actuator moved by the first control signal is a threshold or more, and the rack force value of the road wheel actuator is a predetermined rack force value or more and, if the counted value is a predetermined value or more, sets the maximum displacement position value of the road wheel actuator as the counterclockwise full stroke value.

7. A steering control method, comprising:
   transmitting, to a road wheel actuator operably coupled to road wheels to steer the road wheels, a first control signal to move by a position value corresponding to a predetermined rotation angle, counterclockwise from a neutral position of a steering wheel feedback actuator operably coupled to a steering wheel to provide a reaction force to the steering wheel and not mechanically coupled with the road wheel actuator;
   receiving a maximum displacement position value of the road wheel actuator moved by the first control signal;
   transmitting, to the road wheel actuator, a second control signal to move by a position value corresponding to the predetermined rotation angle, clockwise from the neutral position of the steering wheel feedback actuator;
receiving a maximum displacement position value of the road wheel actuator moved by the second control signal; and setting a mid-point of the steering wheel feedback actuator and a mid-point of the road wheel actuator based on the maximum displacement position values of the road wheel actuator moved by the first control signal and the second control signal, wherein setting the mid-point includes setting a counterclockwise full stroke value of the steering wheel feedback actuator based on a difference between the position value of the first control signal and the maximum displacement position value of the road wheel actuator moved by the first control signal, setting a clockwise full stroke value of the steering wheel feedback actuator based on a difference between the position value of the second control signal and the maximum displacement position value of the road wheel actuator moved by the second control signal, and setting a mid-value between the clockwise full stroke value and the counterclockwise full stroke value as the mid-point between the steering wheel feedback actuator and the road wheel actuator, and wherein setting the mid-point includes, if the difference between the maximum displacement position value of the road wheel actuator moved by the first control signal and the position value of the first control signal is a threshold or more, setting the maximum displacement position value of the road wheel actuator as the counterclockwise full stroke value of the steering wheel feedback actuator.

8. The steering control method of claim 7, wherein receiving the counterclockwise maximum displacement position value includes setting a value larger than a rotation angle corresponding to the counterclockwise full stroke value of the steering wheel feedback actuator as a predetermined rotation angle.

9. The steering control method of claim 7, wherein setting the mid-point includes counting, every predetermined cycle, when the difference between the position value of the first control signal and the maximum displacement position value of the road wheel actuator moved by the first control signal and, if the counted value is a predetermined value or more, setting the maximum displacement position value of the road wheel actuator as the counterclockwise full stroke value.

10. The steering control method of claim 7, wherein setting the mid-point includes setting the mid-point between the steering wheel feedback actuator and the road wheel actuator based on a rack force value detected at the maximum displacement position value of the road wheel actuator moved by the first control signal and the second control signal.

11. The steering control method of claim 10, wherein setting the mid-point includes setting the maximum displacement position value of the road wheel actuator as a counterclockwise full stroke value if the rack force value is increased by the first control signal and setting the maximum displacement position value of the road wheel actuator as a clockwise full stroke value if the rack force value is decreased by the second control signal to thereby set a mid-value between the clockwise full stroke value and the counterclockwise full stroke value as the mid-point between the steering wheel feedback actuator and the road wheel actuator.

12. The steering control method of claim 11, wherein setting the mid-point includes counting, every predetermined cycle, when the difference between the position value of the first control signal and the maximum displacement position value of the road wheel actuator moved by the first control signal is a threshold or more, and the rack force value of the road wheel actuator is a predetermined rack force value or more and, if the counted value is a predetermined value or more, setting the maximum displacement position value of the road wheel actuator as the counterclockwise full stroke value.

13. A steering control system, comprising:
a steering wheel feedback actuator operably coupled to a steering wheel to provide a reaction force to the steering wheel;
a road wheel actuator operably coupled to road wheels to steer the road wheels and not mechanically coupled with the steering wheel feedback actuator, the road wheel actuator configured to move the road wheels based on a position value corresponding to a rotation angle of the steering wheel feedback actuator;
a sensor detecting a rack force and a position of a rack bar; and
a steering control device setting a mid-point between the steering wheel feedback actuator and the road wheel actuator based on the position value of the road wheel actuator moved according to the rotation angle of the steering wheel feedback actuator, wherein
the steering control device includes:
a receiver receiving at least one sensing data of the rack force and the position of the rack bar from the sensor;
a controller generating a first control signal to move a road wheel actuator by a position value corresponding to a predetermined rotation angle, counterclockwise from a neutral position of a steering wheel feedback actuator and a second control signal to move the road wheel actuator by a position value corresponding to a predetermined rotation angle, clockwise from the neutral position of the steering wheel feedback actuator, and set a mid-point of the steering wheel feedback actuator and a mid-point of the road wheel actuator based on maximum displacement position values of the road wheel actuator moved by the first control signal and the second control signal; and
a transmitter transmitting the first control signal and the second control signal to the road wheel actuator,
wherein the controller sets a counterclockwise full stroke value of the steering wheel feedback actuator based on a difference between the position value of the first control signal and the maximum displacement position value of the road wheel actuator moved by the first control signal, sets a clockwise full stroke value of the steering wheel feedback actuator based on a difference between the position value of the second control signal and the maximum displacement position value of the road wheel actuator moved by the second control signal, and sets a mid-value between the clockwise full stroke value and the counterclockwise full stroke value as the mid-point between the steering wheel feedback actuator and the road wheel actuator, and
wherein if the difference between the maximum displacement position value of the road wheel actuator moved by the first control signal and the position value of the first control signal is a threshold or more, the controller sets the maximum displacement position value of the road wheel actuator as the counterclockwise full stroke value of the steering wheel feedback actuator.

\* \* \* \* \*